Jan. 2, 1962 J. R. CAMPBELL 3,015,715
METHOD AND APPARATUS FOR RESISTANCE WELDING
Filed June 13, 1958
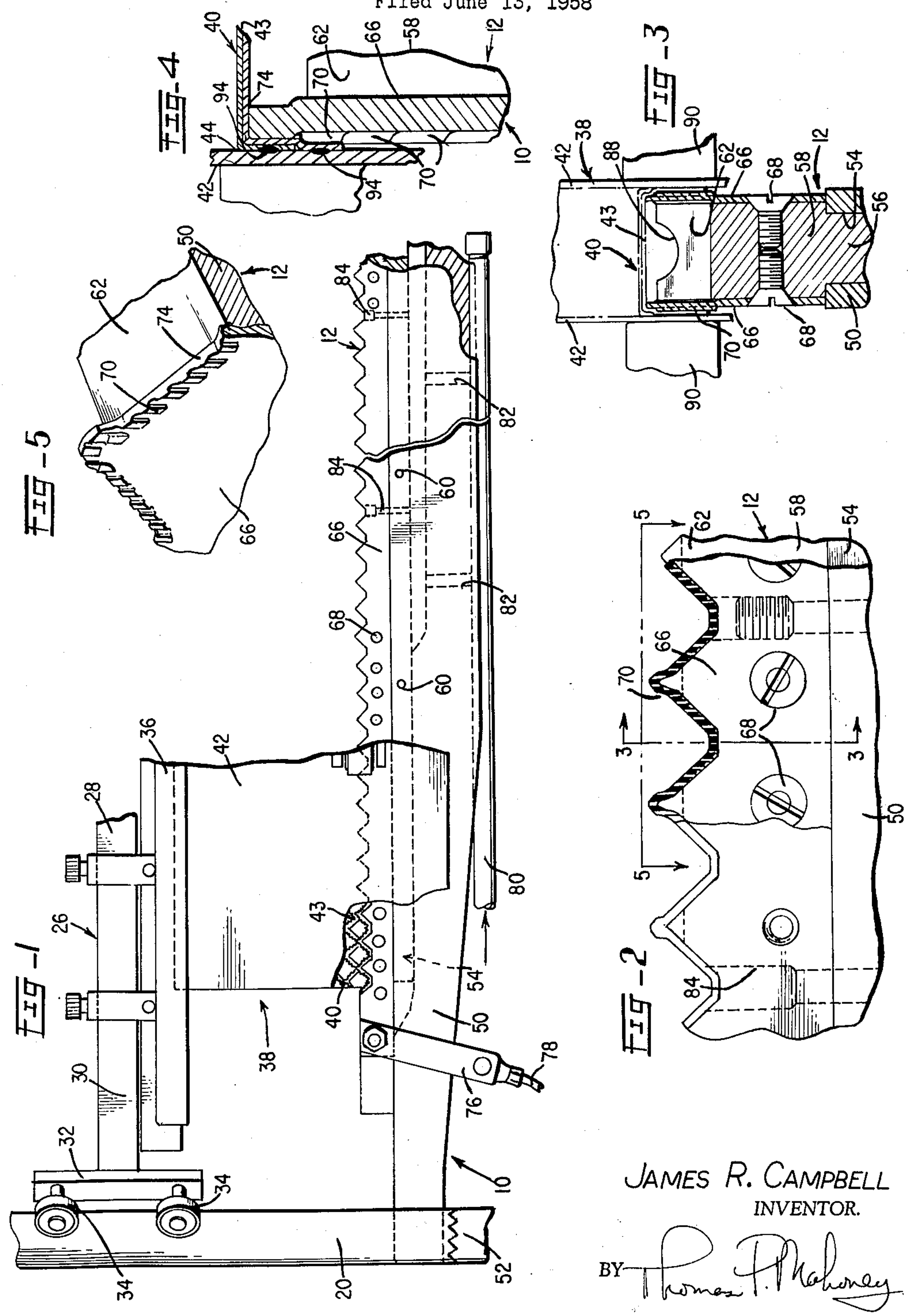
JAMES R. CAMPBELL
INVENTOR.
BY Thomas P. Mahoney
ATTORNEY.

United States Patent Office 3,015,715
Patented Jan. 2, 1962

3,015,715

METHOD AND APPARATUS FOR RESISTANCE WELDING

James R. Campbell, 1504 Carmelita St., Laguna Beach, Calif.

Filed June 13, 1958, Ser. No. 741,802
2 Claims. (Cl. 219—117)

This invention relates to a method and apparatus for resistance welding metallic sheets to each other whereby accurate location of the weld "nugget" can be achieved in order that a weld of maximum strength may be attained between the abutting faces of the sheets being welded.

In order to describe the apparatus and method of my invention, I will discuss the principles thereof herein as applied to the fabrication of honeycomb core reinforced panels wherein the honeycomb core is formed from a stainless steel foil and wherein the skins or surface sheets of the panel are formed from stainless steel sheets of material. However, it is to be understood that while utilizing this particular application for purposes of illustration, I do not intend to limit the practice of the invention to this particular illustrative embodiment.

A honeycomb core reinforced panel of the character fabricated by the apparatus and method of the present invention is illustrated in detail in my copending applications Serial No. 532,605, filed September 6, 1955, now Patent No. 2,910,153, issued October 27, 1959, and entitled "Structural Panel of Honeycomb Type," and Serial No. 646,879, filed March 18, 1957, now Patent No. 2,959,257, issued November 8, 1960, and entitled "Honeycomb Core and Panel Utilizing Same." Therefore, no detailed description of the advantages and mode of utilizing the honeycomb core reinforced panel to which the teachings of the present invention are applied will be presented herein.

Honeycomb core reinforced panel usually includes a honeycomb core fabricated from corrugated strips of stainless steel foil of the order of .002 inch in thickness having surface skins or sheets secured to the opposite faces thereof, said surface sheets usually being constituted by sheets of stainless steel having a thickness in the range between .010 and .020 inch in thickness. In a construction disclosed in the above referenced applications, the individual core strips are provided with right-angularly bent, continuous flanges on the opposite edges thereof and the core is fabricated by interlocking the crests or nodal points of the flanges one within the other. The core structure itself can be assembled separately or can be assembled simultaneously with the fabrication of the panel as disclosed in my copending application, Serial No. 639,536, filed February 11, 1957, and entitled "Method and Apparatus for Fabricating Structural Panel and Core Therefor," now Patent No. 2,930,882, issued March 29, 1960.

Therefore, since the flanges on the opposite faces of the core abut on the interior surfaces of the surface sheets, the core and the core strip constituting the same can be welded to the interior surfaces of the surface sheets to accomplish secure affixation of the core and the core strip in operative relationship with each other and with the surface sheets.

However, during the welding process some difficulty is encountered when conventional methods are utilized to resistance weld the flanges of the core to the surface sheets. This difficulty is attributable, in large part, to the fact that the thickness of the core stock is substantially less than the thickness of the surface sheets with the result that the welding zone wherein the weld "nugget" is created tends to occur largely within the material of the surface sheets and thus a minimal weld is achieved at the interface between the surface sheets and the flanges of the core. Such weld is, of course, unsatisfactory and, in addition, the mislocation of the welding zone largely within the surface sheets results in disfiguration on the external surfaces of the surface sheets.

It is, therefore, an object of my invention to provide a method of resistance welding two sheets of electrically conductive materials to each other which will eliminate the aforementioned difficulty and which will insure that the welding zone will be located at the interface between the surface sheets and the core flanges in order that a maximum weld may be obtained between the core flanges and the interior surfaces of the surface sheets.

Another object of my invention is the provision of a method of resistance welding which includes the step of localizing the welding area at the flanges of the core, thus considerably increasing the effective electrode contact resistance between the thin material and its abutting electrode and insuring that the welding will take place between the adjacent surfaces of the core flanges and the surface sheets, it being well known that the weld "nugget" tends to move toward the electrode of highest contact resistance.

With welding electrodes of identical contact resistance, and when welding two pieces of material together which have essentially the same properties, the weld "nugget" will be placed in the geometric center of the distance between the two electrodes. Thus, if the two pieces of material are .002 and .020 thick, the center of the weld "nugget" will lie .011 from the outer face of the thick material and .011 from the outer face of the thin material; and in order to have the thin material become part of the "nugget," so as to be secured, the "nugget" thickness must at least be .018. This means that at least 90% of the thicker material has been nuggetized, which results in severe shrinkage and the consequent buckling of the thick material as the weld line or seam progresses.

Thus, some "throwing" of the "nugget" will result from the use of a more highly conductive material in the electrode contacting the thicker sheet and a less highly conductive material in the electrode contacting the thin sheet. As an example, the use of Mallory #3 alloy, having 85% conductivity, on the former, and Mallory #100 alloy, having 50% conductivity, on the latter will effect about as much "nugget" "throwing" as possible. When alloys having less than 50% conductivity are utilized, the effective electrode contact resistance becomes greater and the "nugget" is "thrown" farther toward the electrode having the highest effective contact resistance, but alloying between the electrode and the material being welded occurs. This is commonly called "sticking" but is an actual alloying of the electrode with the material being welded and is caused by excessive heat at the electrode surface. This heat results from the poorer thermal conductivity, which goes hand in hand with electrical conductivity, not permitting the intense heat at the point of contact from being quickly dissipated into the supporting and surrounding portions of the electrode.

Resistance can be built into the electrode face by serrations, wherein the effective contact resistance of each tiny serration is not so high as to cause alloying, but when the serrations are taken as a group, the effective contact resistance of the electrode can be controlled to almost any value desired and the weld "nugget" can be "thrown," as in the case of .002 and .020 material, .010 off center. This results in a secure attachment of the thin to the thick sheet with a very much smaller "nugget," greatly reduced discoloration, reduced impairment of the thick material, and very substantially reduced shrinkage and buckling of the thick material.

Further, inasmuch as it is virtually impossible to prevent some "tracking" or depressing of the material contacted by the serrate electrode, it is preferable to have the serrations running parallel to the direction of stripping so that, as in the case of internal welding, the welded parts may be easily removed from the internal serrate electrode.

A further object of my invention is the provision of an apparatus adapted to be utilized in practicing the method of the invention and consisting, primarily, of a movable electrode adapted to be imposed against the exterior surface of the surface sheets and a fixed electrode adapted to be located internally of the core strips of the core, both of said electrodes being connected to a source of welding potential. The fixed electrode is provided with a discontinuous welding surface embodying a plurality of spaced projections which can engage the adjacent surfaces of the core flanges and which accomplishes the application of the welding potential at predetermined points along the core flanges, thus insuring that the welding zone will be properly located at the interface between the core flanges and the interior surfaces of the surface sheets.

Another object of my invention is the provision of a welding apparatus of the aforementioned character wherein the fixed electrode includes a central mounting and a pair of oppositely disposed demountable welding plates, said welding plates having serrate welding surfaces constituted by a plurality of serrations adapted to be imposed against the interior surfaces of the core flanges and whereby the welding zone at said flanges is localized to concentrate the welding potential and insure the creation of an adequate weld at the interface between the core flanges and the interior surfaces of the surface sheets.

The provision of demountable welding plates of the character specified hereinabove and the coining of the serrations in the welding surfaces thereupon materially reduces the cost of the welding electrode since the serrations can be coined at relatively low cost by means of a progressive die with considerable accuracy and the necessity for providing machined welding surfaces upon the electrode is eliminated.

Another object is to provide serrations having a shape and direction such as to allow the free stripping of the welded parts from the fixed electrode.

A further object of the invention is to provide, with the serration valleys, a means for exceptionally intimate flow of cooling water through the weld zone of the flange to the face sheet.

Other objects and advantages of the invention will be apparent from the following specification and the accompanying drawing which is for the purpose of illustration only and in which:

FIG. 1 is a fragmentary, sectional view showing the relevant portion of the welding apparatus of the invention;

FIG. 2 is an enlarged, fragmentary, sectional view of the composite welding electrode of the invention;

FIG. 3 is a transverse, sectional view taken on the broken line 3—3 of FIG. 2;

FIG. 4 is an enlarged, fragmentary, sectional view illustrating the relationship between the welding plates of the fixed electrode and the adjacent surface of the flange with which the welding plate is associated; and FIG. 5 is an enlarged, fragmentary view taken from the broken line 5—5 of FIG. 2.

Referring to the drawing and particularly to FIG. 1 thereof, I show a welding apparatus 10 constructed in accordance with the teachings of my invention and being generally of the same construction as the apparatus shown in my copending application, Serial No. 639,536, referred to hereinabove. Since the only significant difference between the welding apparatus disclosed in the immediately aforementioned application and the present apparatus 10 lies in the provision of a composite fixed electrode, reference is made to the aforementioned application for details of construction not disclosed herein.

In the apparatus 10, track members 20 are provided upon which is supported a carriage 26 including a horizontally oriented carrier 28 which incorporates an elongated supporting bar 30 whose opposite ends are secured to vertically oriented mounting bars 32 in which are journaled track engaging wheels or rollers 34. The carriage 26 can be moved upwardly and downwardly on the tracks 20 and has an elongated clamping means 36 associated therewith, said clamping means being adapted to engage the upper extremity of a honeycomb core reinforced panel 38 in the process of fabrication in the apparatus 10.

The panel 38 includes an internal honeycomb core 40 having surface sheets 42 applied to the opposite faces thereof. The honeycomb core 40 is constituted by a plurality of core strips 43, said core strips incorporating right-angularly directed flanges 44 which are adapted to contact the inner surfaces of the surface sheets 42 and to be welded thereto by the utilization of the apparatus 10 and the steps of the method of the invention.

The composite, fixed welding electrode 12 includes an elongated support bar 50 which has its opposite extremities secured to the vertically oriented track 20 as by means of a serrated pad 52 which permits indexing of said bar to facilitate longitudinal translation of the core strips 43. The support bar 50 incorporates a centrally located groove 54 extending longitudinally of the bar, as best shown in FIGS. 1–3 of the drawing, said elongated groove 54 being adapted to receive the reduced lower extremity 56 of a spacer bar 58 which is secured in operative relationship with said groove by means of pins 60 or similar fasteners.

The upper surface of the spacer bar 58 is provided with a plurality of corrugations 62, said corrugations conforming substantially to the corrugations of the individual core strips 43 where they are superimposed upon the composite electrode 12, in a manner to be described in greater detail below. Demountable welding strips or plates 66 are secured to the opposite sides of the spacer bar 58 by means of screws 68 or suitable fasteners. The upper edges of the welding plates 66 are provided with a plurality of protrusions or serrations 70 which are engageable with the inner surfaces of the core strip flanges 44 in the manner shown in FIGS. 3 and 4 of the drawing.

It will be noted that the upper edges of the welding plates 66 are corrugated in the same manner as the spacer bar 58 and that the flats 74 on said upper edges engage the webs of the core strips 43 to support the same.

The extremities of the welding plates 66 are connected to a source of welding potential similar to any one of those disclosed in my copending application Serial No. 639,536 by means of a connector clamp 76 and associated conductor 78.

It will also be noted that a water inlet pipe or conduit 80 is provided which is connected with passages 82 in the support bar 50 which, in turn, communicates with passages 84 through the spacer bar 58. Water or other fluid flowing through the conduit 80 is thus fed into the passages 82 and thence into the passages 84, flowing ultimately across the upper edge of the spacer bar 58 and through semi-circular grooves 88 provided in said upper surface.

As the water or other coolant flows across the upper surface of the spacer bar 58, it also flows through minute spaces between the flats 74 on the upper edges of the welding plates 66 and the web of the adjacent core strip 43, thus permitting the coolant to flow downwardly between the serrations or projections 70 and cool the welding plates 66 and the areas of the panels 38 being welded.

Operatively associated with the apparatus 10 are welding rollers 90 of conventional configuration, said rollers having treads which are at least equivalent in width to the depths of the corrugations on the welding plates 66 in order that a welding potential may be applied between the welding rollers 90 and the individual serrations 70.

The welding rollers 90 are connected to the same source of potential as the fixed electrode 12 and constitute movable electrodes whereby welds 94 at the interface between the inner surface of the respective surface sheets 46 and the flange 44 of the core strip 43 may be created.

In utilizing the apparatus 10 to practice the method of the invention, a pair of surface sheets 42 is suspended by means of the clamping means 36 in spaced relationship on the supporting bar 50 and a core strip 43 is disposed in overlying relationship with the corrugations thereof in registry with the corrugations on the welding plates 66. The carriage 26 is then dropped downwardly on the tracks 20 to permit the elongated, fixed electrode 12 to be located within the space defined between two spaced surface sheets 42 and a welding potential is then applied to the welding rollers 90 and to the elongated, fixed electrode 12.

As the welding rollers 90 are translated across the outer surfaces of the surface sheets 42, they successively establish linear contact with the surface sheets in the regions overlying the serrations 70 to cause the creation of welds 94 between the flanges 44 of the core strips 43 at the interfaces between the flanges 44 and the inner surfaces of the surface sheets 42. Thus, the weld is localized between the linear contact of the rollers 90 and the serrations 70 on the welding plates 60. The relative breadth of the projections 70 can be controlled in accordance with the thicknesses of the materials being welded to each other. As best shown in FIG. 4 of the drawing, it can be seen that the thickness of the surface sheet 42 is approximately three times that of the thickness of the foil utilized in the core strips and thus the serrations 70 are relatively broad. On panels using, for example, .0015 core material and .020 face sheets, I have found that the serrations should be about 50 per inch. In any event, by localizing the welding potential in the above described manner, it is possible to insure that the welding "nugget" will be located at the interface between the inner surfaces of the surface sheets 42 and the corresponding flange 44 of the core strip 43.

Therefore, as the welding wheels 90 are translated across the exterior surfaces of the surface sheets 42, a series of welds 94 is created between the surface sheets 42 and the adjacent flanges 44 of the core strips 43, said welds 94 being located in the interface between the surface sheets and said flanges. While I have shown and described my invention as applied in the fabrication of core reinforced panel 38, it is, of course, conceivable that internal welding of the character disclosed can be utilized in many other applications than honeycomb core reinforced panels and I do not intend the practice of the invention or the use of the apparatus 10 to be limited to the specific material disclosed.

Furthermore, by providing a composite, fixed electrode 12 of the character of that disclosed wherein the welding plates 66 are demountably associated with the support and spacer bars 50 and 58, respectively, I achieve economies in fabricating the electrode 12 which are reflected in the ultimate cost of the panel 38. For instance, instead of fabricating the entire electrode 12 from a single piece of conductive material by machining the serrations 70 in the sides thereof, it is only necessary to utilize a coining process to form the serrations 70 in the upper edges of the plates or strips 66. In addition, since the plates 66 can be fabricated at relatively low cost, they can be maintained in optimum condition insuring maximum quality weld at all times. All that is necessary to replace the plates 66 is the removal of the fastening screws 68 and the substitution of new plates therefor. This is a relatively simple task which can be accomplished with a minimum expenditure of time and effort.

I thus provide by my invention an apparatus wherein a weld may be achieved between different thicknesses of sheet material and the location of the weld in the optimum position at the interface between abutting surfaces of the sheets is accomplished.

Of importance also is the provision of the compositely constructed electrode referred to in detail hereinabove, said electrode being manufactured at moderate cost and being maintainable at optimum performing efficiency without the need for expensive reworking and the like by the mere substitution of one pair of welding plates for another.

I claim:

1. In a resistance welding electrode, the combination of: an elongated supporting bar; and welding paltes on opposed surfaces of said bar connectible to a source of welding potential, said welding plates each being of corrugated configuration and incorporating a plurality of welding projections arranged in a continuous corrugated pattern along the length of each plate.

2. A resistance welding electrode including an elongated bar having a side wall the upper edge of which is of corrugated configuration, said side wall being provided with a continuous series of spaced welding projections conforming to the corrugated configuration thereof.

References Cited in the file of this patent

UNITED STATES PATENTS

| | | |
|---|---|---|
| 1,042,885 | Budd et al. | Oct. 29, 1912 |
| 1,172,301 | Murray et al. | Feb. 22, 1916 |
| 1,172,302 | Murray | Feb. 22, 1916 |
| 1,206,890 | Murray et al. | Dec. 5, 1916 |
| 1,300,068 | Weed | Apr. 8, 1919 |
| 1,303,919 | Lachman | May 20, 1919 |
| 1,973,986 | Kuhlman | Sept. 18, 1934 |
| 2,820,882 | Johnson | Jan. 21, 1958 |